(12) United States Patent
Peppett

(10) Patent No.: US 6,497,268 B1
(45) Date of Patent: Dec. 24, 2002

(54) SCREENS

(76) Inventor: Robert Anthony Peppett, c/o Brastan s.r.o., Morasice 17, 569 51 Morasice u Litomysle (CZ)

( * ) Notice: Subject to any disclaimer, the term of this patent is extended or adjusted under 35 U.S.C. 154(b) by 0 days.

(21) Appl. No.: 09/715,848

(22) Filed: Nov. 15, 2000

(30) Foreign Application Priority Data

Nov. 16, 1999 (GB) ................................................ 9927027

(51) Int. Cl.$^7$ ................................................ E06B 3/30
(52) U.S. Cl. ........................................ 160/374.1; 160/377
(58) Field of Search ............................ 160/374.1, 378, 160/377, 381, 374, 371, 369, 405; 38/102.5, 102.4

(56) References Cited

U.S. PATENT DOCUMENTS

| 1,916,022 A | * | 6/1933 | Shull | 160/374.1 |
|---|---|---|---|---|
| 3,211,089 A | * | 10/1965 | Messerschmitt | 160/381 X |
| 3,482,343 A | * | 12/1969 | Hamu | 38/102.5 |
| 3,494,405 A | * | 2/1970 | Sandahl et al. | 160/378 X |
| 3,930,702 A | | 1/1976 | Pichowicz | 312/245 |
| 4,144,660 A | * | 3/1979 | Lamb | 160/378 X |
| 4,190,974 A | * | 3/1980 | Siler | 160/377 |
| 4,625,440 A | * | 12/1986 | Dang et al. | 38/102.5 |
| 4,759,143 A | | 7/1988 | Pomerleau | 40/574 |
| 5,076,162 A | * | 12/1991 | Goin | 160/374.1 X |
| 5,271,171 A | * | 12/1993 | Smith | 38/102.5 |
| 5,368,378 A | | 11/1994 | Curtis | 312/204 |
| 5,531,258 A | * | 7/1996 | Poulson | 160/378 X |
| 5,588,725 A | | 12/1996 | Frank | 312/245 |
| 5,678,906 A | | 10/1997 | Riestra et al. | 312/204 |
| 5,992,070 A | | 11/1999 | Birnbaum | 40/603 |

FOREIGN PATENT DOCUMENTS

| EP | 0 137 970 A1 | 4/1985 |
|---|---|---|
| EP | 0 337 902 A1 | 10/1989 |
| EP | 0 551 058 A2 | 7/1993 |
| FR | 2 261 143 | 9/1975 |
| GB | 512530 | 9/1939 |
| GB | 612635 | 11/1948 |
| GB | 1192955 | 5/1970 |
| GB | 2232520 | 12/1990 |

* cited by examiner

*Primary Examiner*—David M. Purol
(74) *Attorney, Agent, or Firm*—Ladas & Parry

(57) ABSTRACT

A screen, typically for use as a wardrobe or closet door, is disclosed. The screen has a flexible member mountable within a frame, one or more of the corners of the frame being provided with cam arrangements for varying the length of the frame in order to vary the tension in the sheet member.

12 Claims, 8 Drawing Sheets

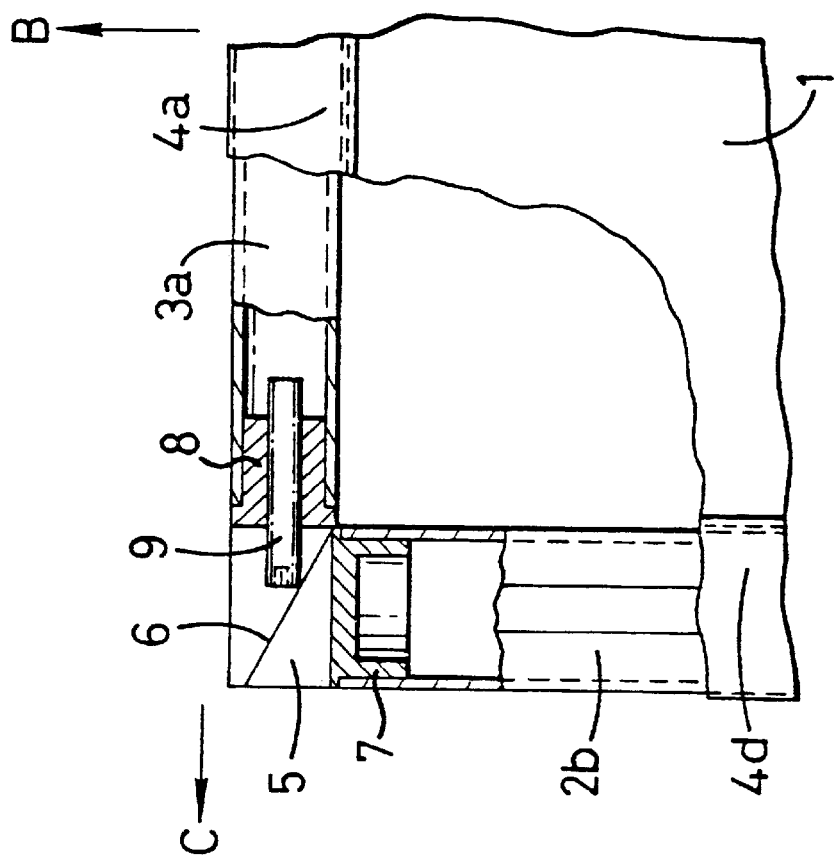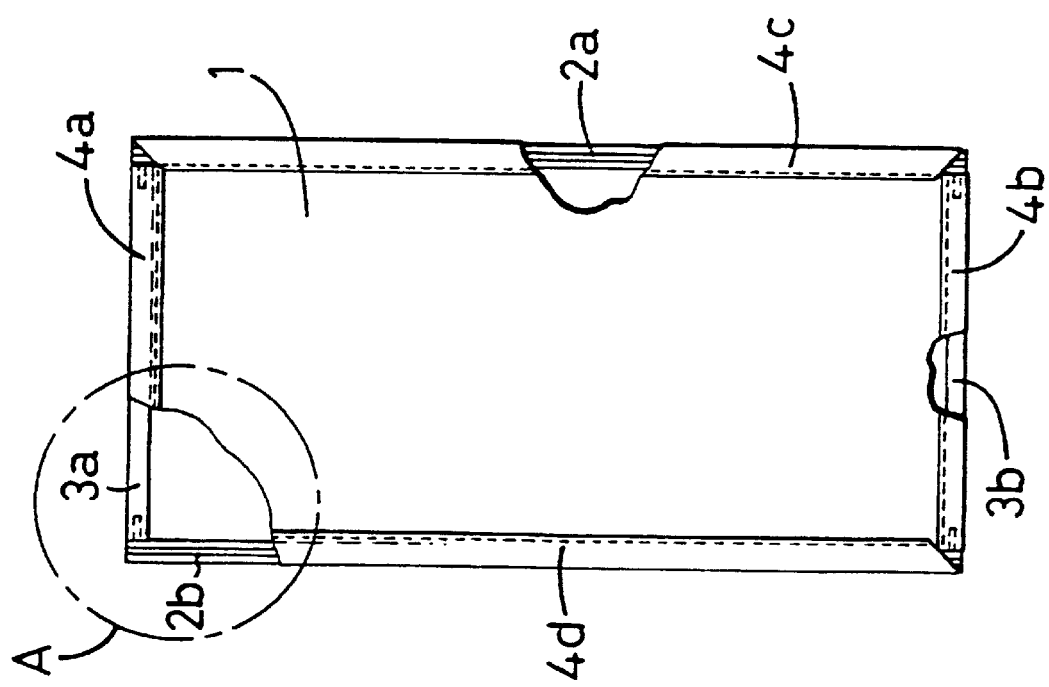

SCREENS

BACKGROUND OF THE INVENTION

1. Field of the Invention

The present invention relates to screens, and more particularly to screens of the kind which are used to visually separate one living/office etc, area from another, However, the present invention may be utilised in relation to other environments and products.

2. Description of the Related Art

A known construction of screen comprises a relatively flexible panel of material, typically hardboard, which is provided with a surrounding frame by which it gains rigidity. Such screens can typically be used in a domestic environment as doors for a wardrobe or closet. Such a screen may also comprise a mirror as the relatively flexible panel.

One disadvantage of such a known construction is that it is relatively difficult to transport in its assembled condition, and if it is transported in its assembled condition then there is the disadvantage that all its individual components require transit packaging and arrangements. thus creating increased costs in respect of time, material and transportation.

BRIEF SUMMARY OF THE INVENTION

The present invention is concerned with providing a screen which has a construction which will overcome or minimise the above discussed disadvantages, whilst at the same time providing versatility of design and relatively low cost of manufacture plus adaptability to multifunctional use.

Although the invention has so far been discussed in terms of a product known as a screen, that terms is intended to cover any construction according to the present invention which could be used for other purposes than the ones already discussed.

According to the present invention a screen comprises a sheet member which is capable of being rolled up, in combination with at least two frame members which are adapted to be located in a periphery of the laminar member when it is in an unrolled condition, each of the at least two frame members having associated with its end or ends a mechanism whereby the two frame members may be connected together, the said mechanism being characterised by including a cam arrangement by which the relative positions of the at least two frame members may be adjusted to thereby vary the tension in the laminar member.

Typically, the sheet member would comprise a roll known type of fabric such as might be used to construct a window blind.

BRIEF DESCRIPTION OF THE SEVERAL VIEWS OF THE DRAWINGS

How the invention may be carried out will now be described by way of example only and with reference to the accompanying drawings, in which;

FIG. 5 is a view of the fully assembled screen of FIG. 1;

FIG. 6 is an enlarged view, in section, illustrating the corner identified by 'A' in FIG. 5;

BRIEF DESCRIPTION OF THE APPENDIX

Figure 24:
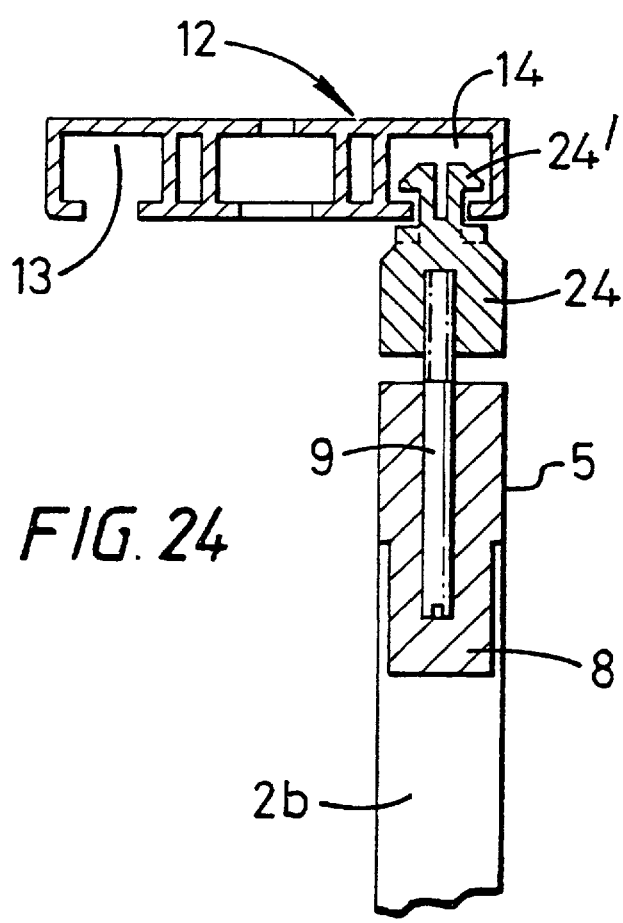
FIG. 24 illustrates an alternative to the arrangements of FIGS. 17 and 18 for slidably connecting a screen to the track of FIGS. 14 and 15.

The Appendix "Final Running Components" illustrates in more detail the runner member and cam member as shown in FIG. 24.

FIGS. 1 to 6

Figure 1:
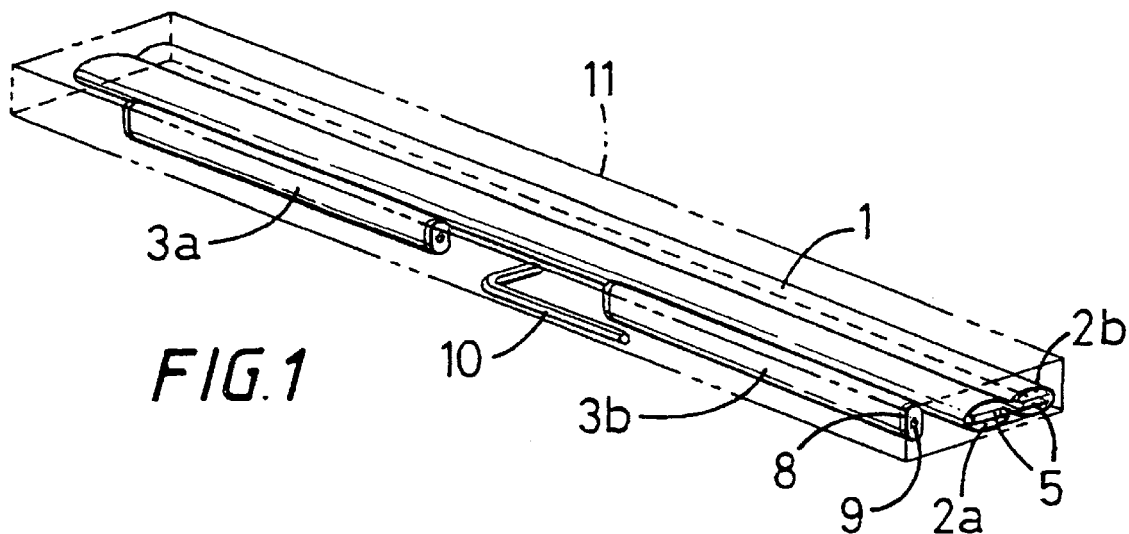
FIG. 1 illustrates a screen kit according to a first embodiment of the present invention.

The first embodiment of the present invention consists of a rectangular screen which would be purchased in the form of the kit illustrated in FIG. 1.

The screen consists essentially of a roll of fabric 1, which is mounted between and rolled up with two longitudinal frame members 2a and 2b, which are contained in pockets formed in the longitudinal sides of the fabric. The kit also includes two loose transverse frame members 3a, 3b and an Allen key, 10, the whole kit being initially contained in a box, 11.

Figure 2:
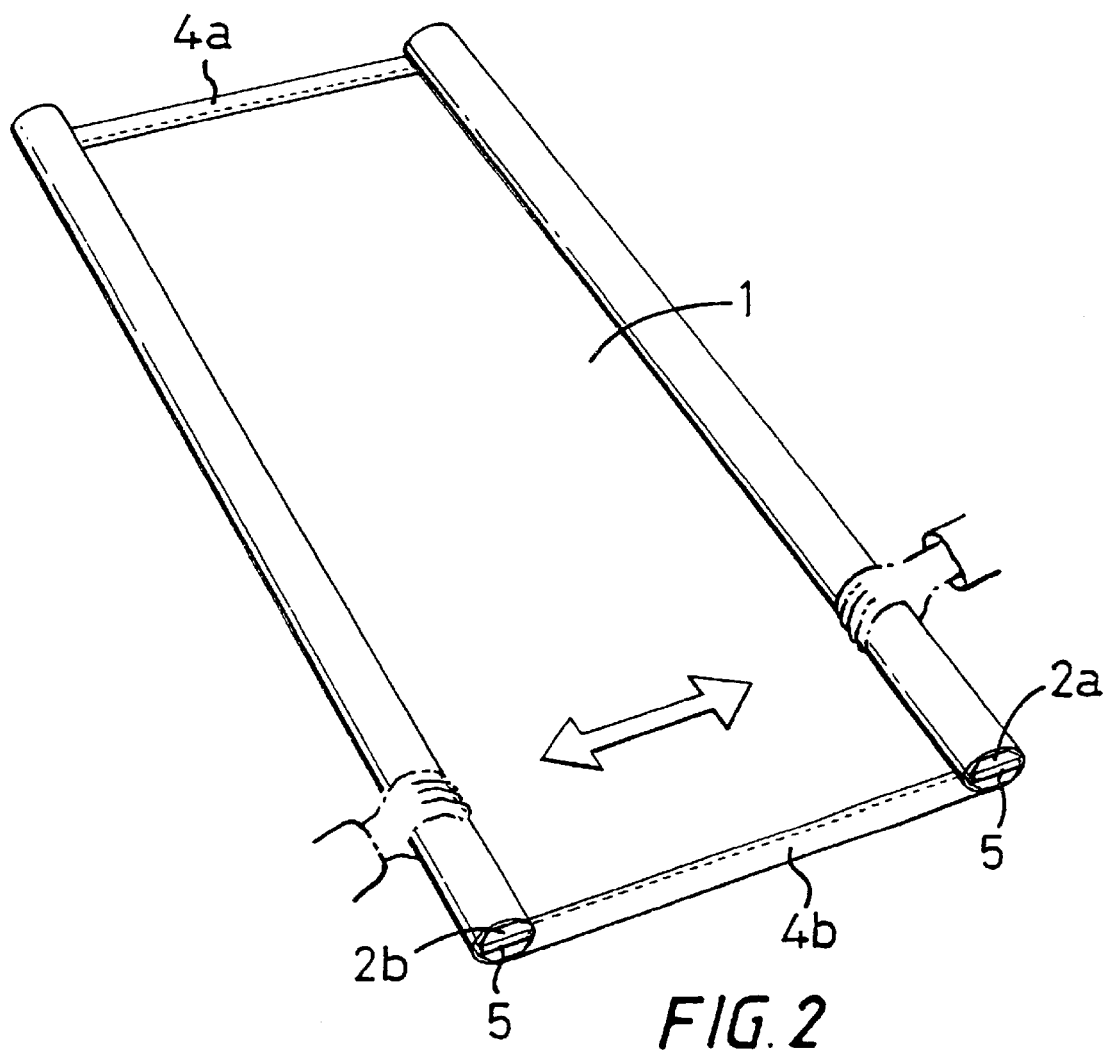
FIG. 2 illustrates the screen kit of FIG. 1 in a first partially assembled condition.

In order to assemble the frame, the fabric, 1 is unrolled from around the two longitudinal frame members, 2a and 2b as shown in FIG. 2.

The short exposed ends of fabric 1 have pockets. 4a, 4b formed in them.

Figure 3:
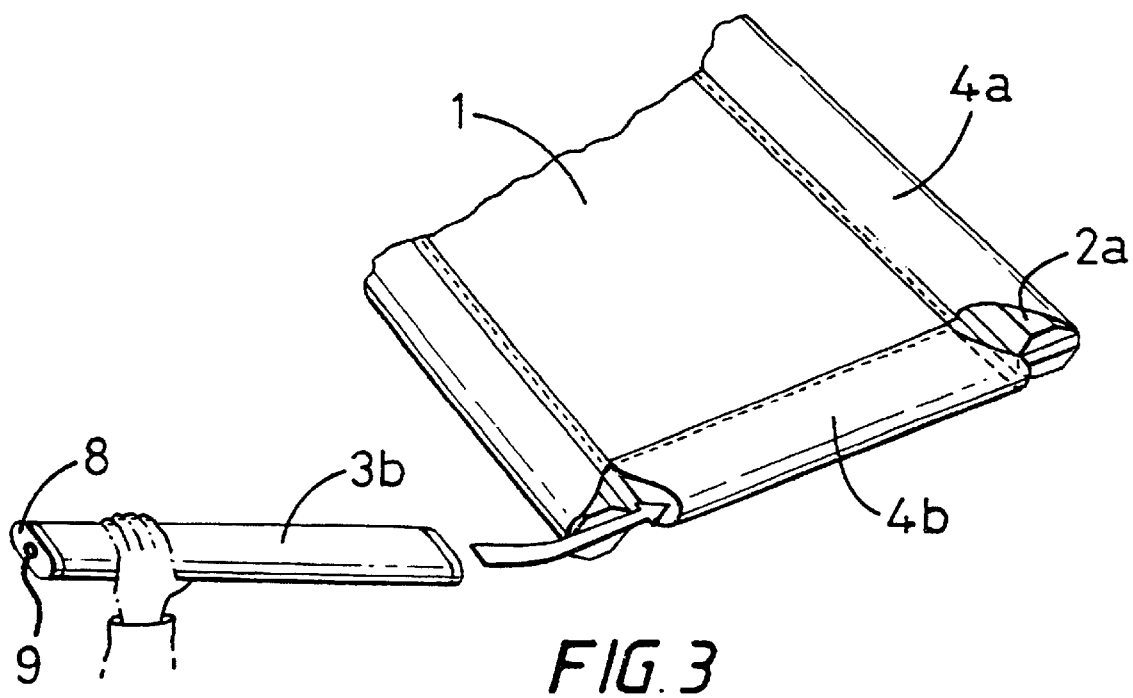
FIG. 3 illustrates the screen kit of FIG. 1 in a more advanced partially assembled condition.

Having unrolled the fabric to form a sheet, 1, the two transverse frame members 3a and 3b are then inserted respectively into the pockets 4a and 4b in the manner illustrated in FIG. 3.

The ends of the longitudinal frame members 2a, 2b and transverse frame members 4a, 4b have co-operating mechanisms or arrangements by which those ends can be connected to one another and also by which the tension in the fabric 1 may be adjusted.

Figure 4:
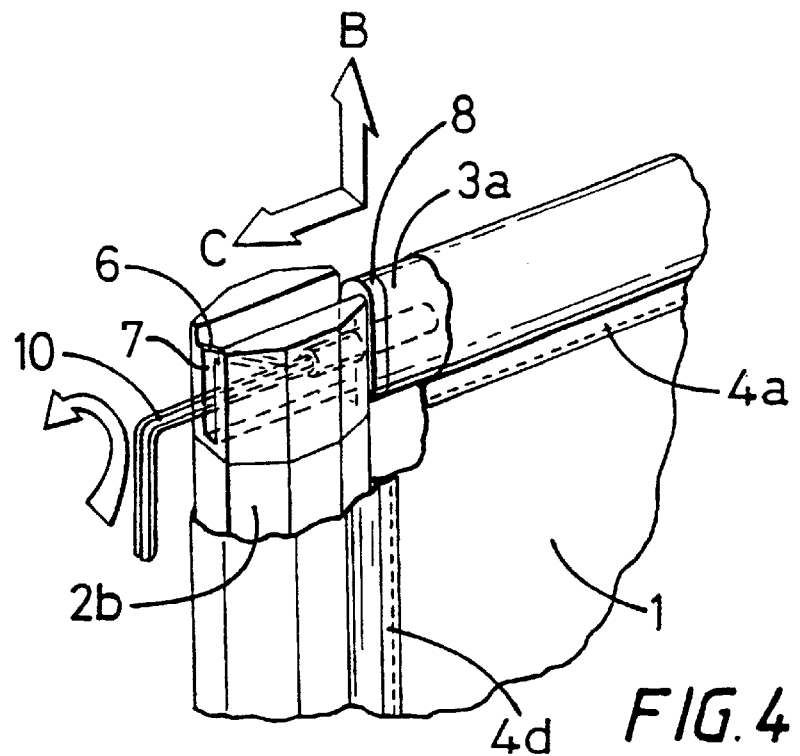
FIG. 4 is a detail on an enlarged scale of a corner of the screen of FIG. 1 illustrating the assembly of that corner.
Figure 7:
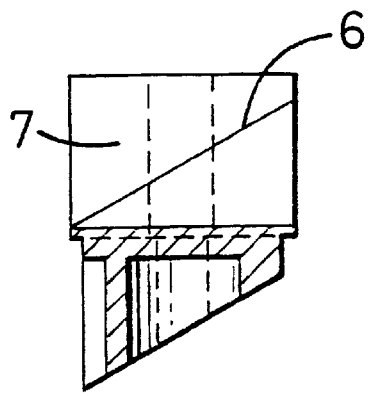
FIGS. 7 to 10 illustrate the cam member four of which form part of the four corner connections of the embodiment of FIG. 1.
Figure 8:
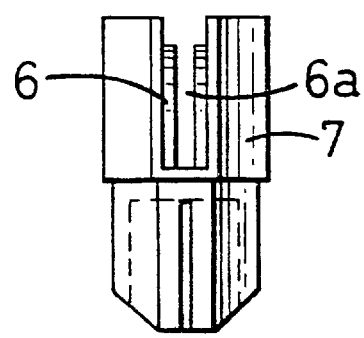
Figure 9:
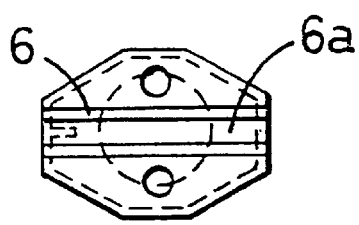
Figure 10:
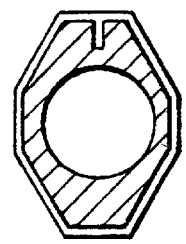
Figure 11:
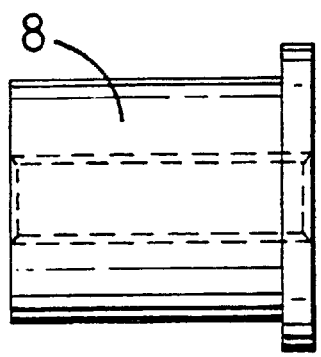
FIGS. 11 to 13 illustrate the screw-mounting member which forms the other part of the corner connection of the embodiment of FIG. 1.
Figure 12:
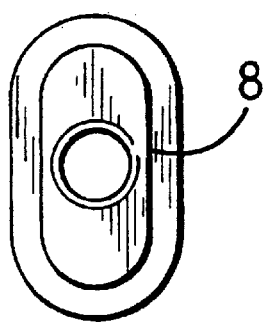
Figure 13:
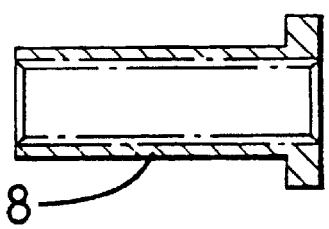

These mechanisms and arrangements are Illustrated in more detail in FIGS. 4 and 6. FIG. 5 shows the assembled frame in its final tensioned configuration.

The connecting arrangement at each of the four corners of the rectangular screen shown in FIG. 5 is shown in more detail in FIGS. 4 and 6 which illustrate the corner indicated by 'A' in FIG. 5.

Each of the four connecting arrangements comprises a cam member, 5, which fits into the open tubular end of a longitudinal frame member 2, and an end cap 8 which fit in the end of an adjacent tubular transverse frame member 3.

The cam member 5 consists essentially of an inclined cam surface, 6, which is integral with a spigot member 7, the latter being a force-fit into the end of the tubular longitudinal frame member 4.

The cam surface 6 is provided with a slot 6a through which an Allen key 10 may be inserted to engage the end of a captive screw 9 which is threaded into the end cap 8.

The captive screw 9 is normally inserted fully within the member 8 so that the left-hand end of the screw, as viewed in FIG. 6, is flush with the left-hand end of the member 8.

After the frame members have been located in the respective pocket 4. the end of the screw member 9 is engaged by the Allen key 10 and rotated so as to make it progressively emerge from the member 8 and contact the cam surface 6, as shown in FIG. 6.

As the screw 9 is progressively drawn out of the member 8, the left-hand side of the screw member 9 will ride up the cam surface 6 which will have the effect of moving the transverse frame member 3a in FIG. 6 in the direction of the arrow 'B', and the frame member 2b in the direction of the arrow 'C' to thus tension the material 1 forming the screen.

By adjusting each of the screws 98 associated with each of the four corners of the frame, the overall tensioning of the material 1 can be effected.

The two components 5 and 8 are shown in more detail in FIGS. 7 to 10 and 11 to 13 respectively.

Although a particular cam arrangement has been illustrated In connection with the first embodiment of FIG. 1, variations may be made to the design of this cam arrangement without departing from the scope of the present invention, as defined in the claims. For example, the detailed design of member 5 may vary as might the cam surface 6 itself. Moreover a different arrangement for mounting the screw 9, or its equivalent, could be employed whilst at the same time resulting in a mechanism which operates in substantially the same way as that described and shown in FIGS. 4 and 6 of the drawings.

Figure 14:
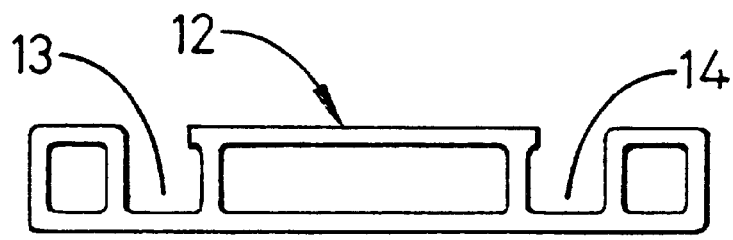
FIGS. 14 and 15 are two views of a track upon which and along which the embodiment of FIG. 1 may be slidably mounted.
Figure 15:
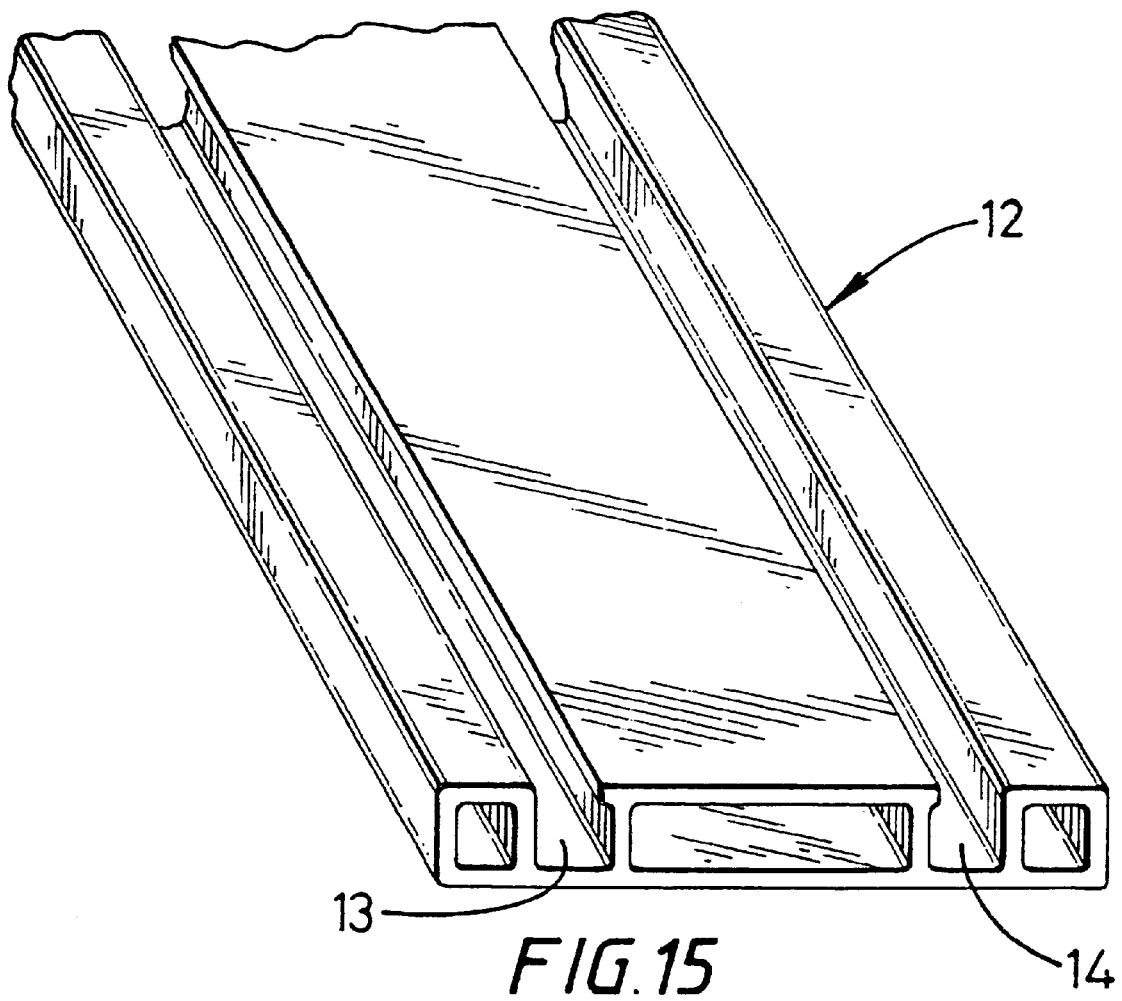

FIGS. 14 and 15

The embodiment shown In FIG. 1 could form part of a screen arrangement in which one or more panels are slidable with respect to one another. Such a typical arrangement would be employed in connection with a wardrobe or closet.

In that application a track would be provided along which a screen or screens as shown in FIG. 1 may be slid. Such a track is illustrated in FIGS. 14 and 15 and comprises a plastic extrusion 12, having two channels 13 and 14, to slidably accommodate a panel such as that shown in FIG. 1.

Figure 16:
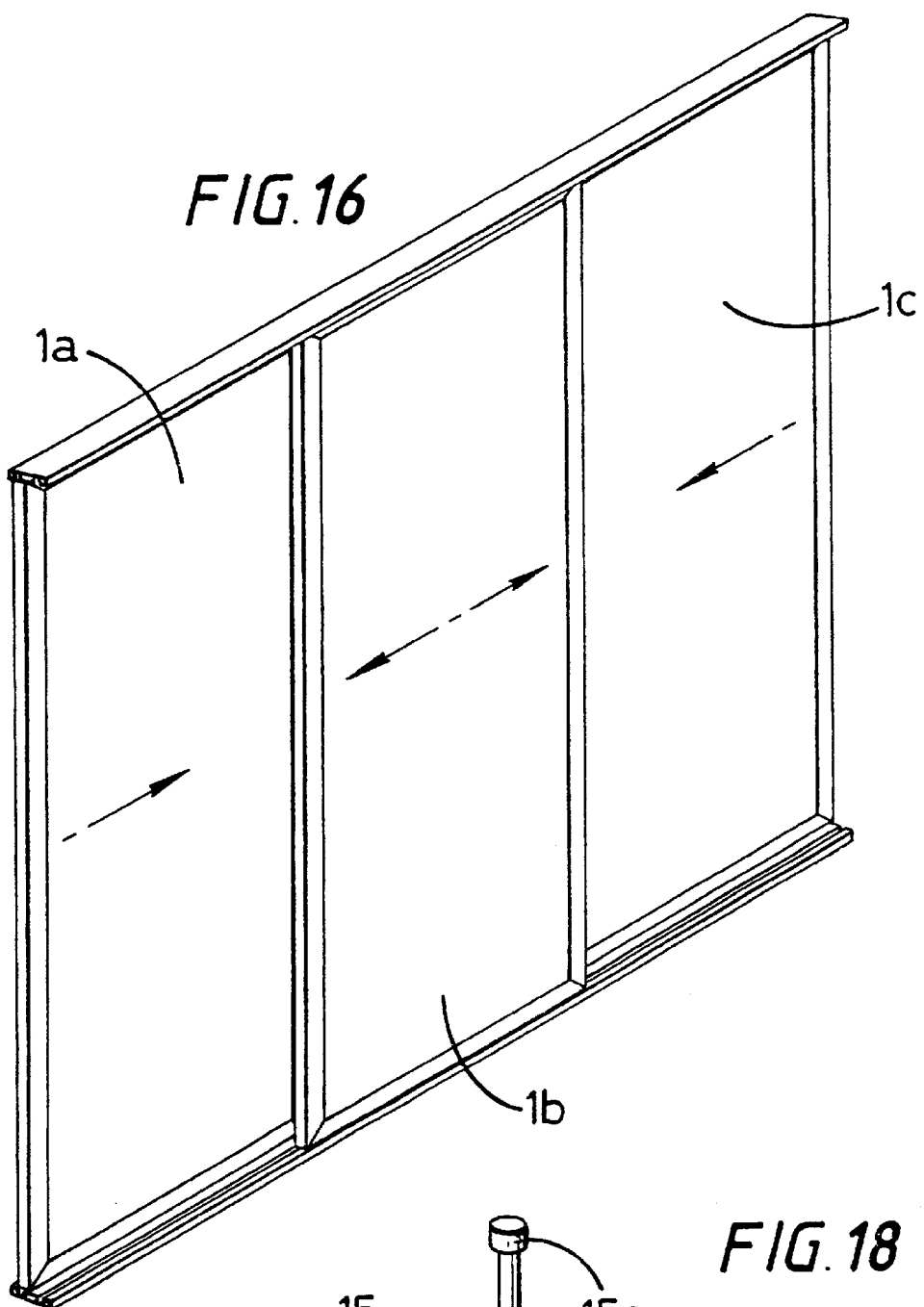
FIG. 16 shows an assembly of screens each having the construction of FIGS. 1 to 13.
Figure 17:
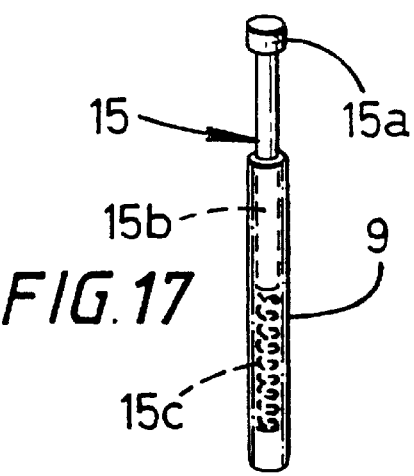
FIG. 17 illustrates a top guide for use with the screen assembly of FIG. 16.
Figure 18:
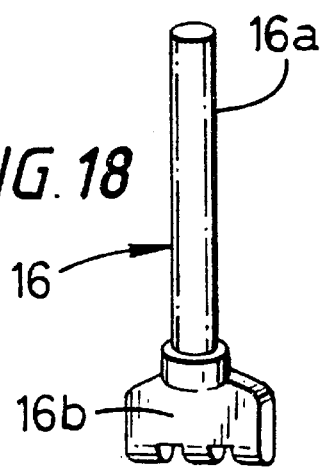
FIG. 18 illustrates a bottom runner for use with the screen assembly of FIG. 16.

FIGS. 16 to 18

FIG. 16 illustrates an arrangement which employs three screens, 1a, 1b and 1c, each essentially of the construction as shown in FIG. 1. The screens 1a, 1b and 1c are slidable with respect to one another on a double sliding track 12, of the construction shown In FIGS. 14 and 15.

The top of each panel 1a, 1b and 1c is provided with a spring-loaded guide peg 15 as shown in FIG. 17. Each peg 15 has a head 15a, which runs in an upper track (not shown), and a lower end 16b. which engages a coil spring 16 which is housed in a cavity formed in the screw 9.

The bottom end of each panel 1a, 1b and 1c is provided with a bottom runner 16 shown in FIG. 18. Each bottom runner 16 consists of a screw thread 16a and a head 16b, the latter being designed to slide within the channel 13 or 14 In the track 12.

FIGS. 19 to 22

Figure 19:
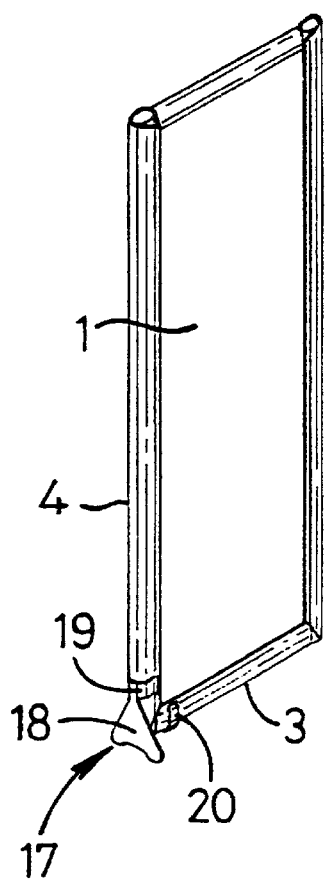
FIG. 19 is a perspective view of a second embodiment of the invention.

In contrast to providing a means to enable the screen or screens to slide with respect to one another between upper and lower runners, it is also possible to utilise a screen, according to the present invention, as a free-standing item. Such an application is illustrated in FIGS. 19 and 20.

Figure 20:
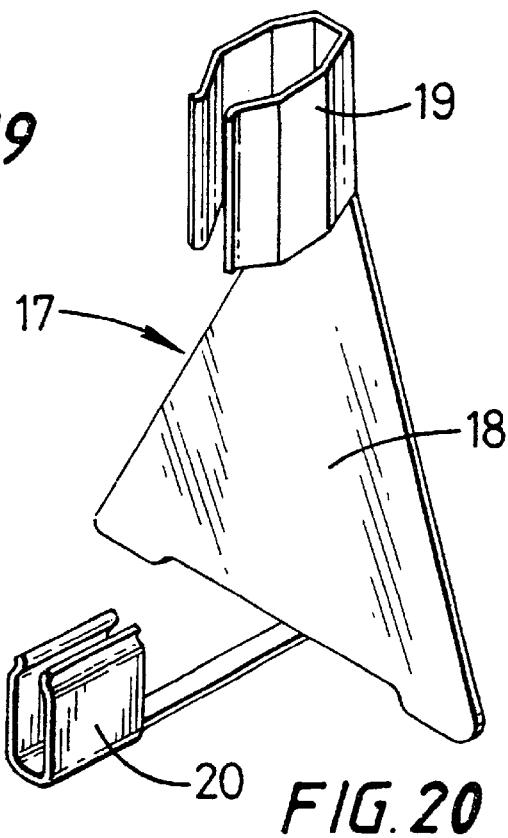
FIG. 20 is a perspective view on an enlarged scale of the hinged dip illustrated in FIG. 19.

The screen 1 is provided with two feet 17 (only one which is shown), the construction of which is shown in more detail in FIG. 20.

Each foot 17 comprises a web 18 and two socket or clip portions 19 and 20, located at substantially ninety degrees to one another.

The socket or clip 19 is adapted to fit around and grip the longitudinal frame member 4 and the socket or clip 20 is adapted to slide around and grip the transverse frame member 3.

Typically the foot 17 is constructed from pressed steel but it could be other material such as a plastics material.

The web 18 is provided with two feet extensions 18a and 18b which would sit on a floor when the screen Is in use. A similar foot would be provided at the other end of the transverse frame member 3.

Figure 21:
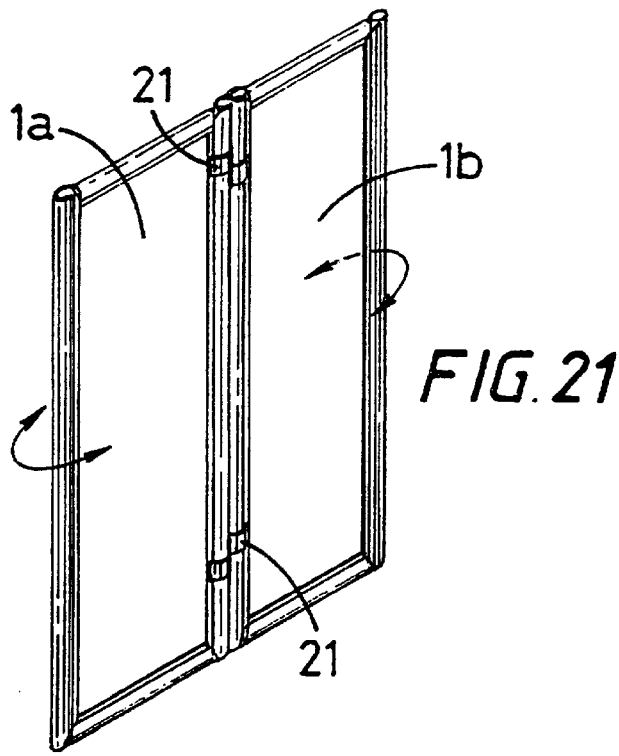
FIG. 21 is a perspective view of a third embodiment of the invention.
Figure 22:
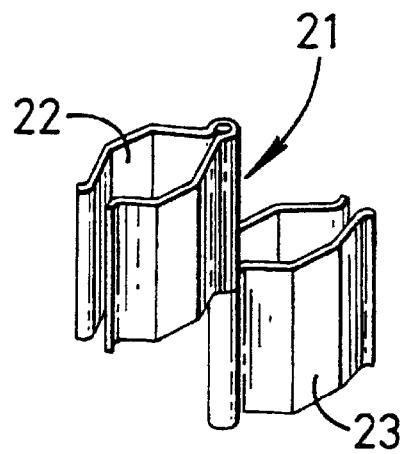
FIG. 22 is a view similar to FIG. 20 of the hinged clip shown in FIG. 21.

FIGS. 21 and 22 illustrate yet another embodiment of the present invention in which two screens, 1a and 1b, are hingedly connected together by means of the hinged clip 21 as shown in FIG. 22.

The hinged clip 21 comprises two socket-like members 22 and 23 which are mounted on a common hinge pin 24.

Typically, a pair of these hinge clips 21 interconnect two screens 1a and 1b, as shown In FIG. 21.

FIG. 23

Figure 23:
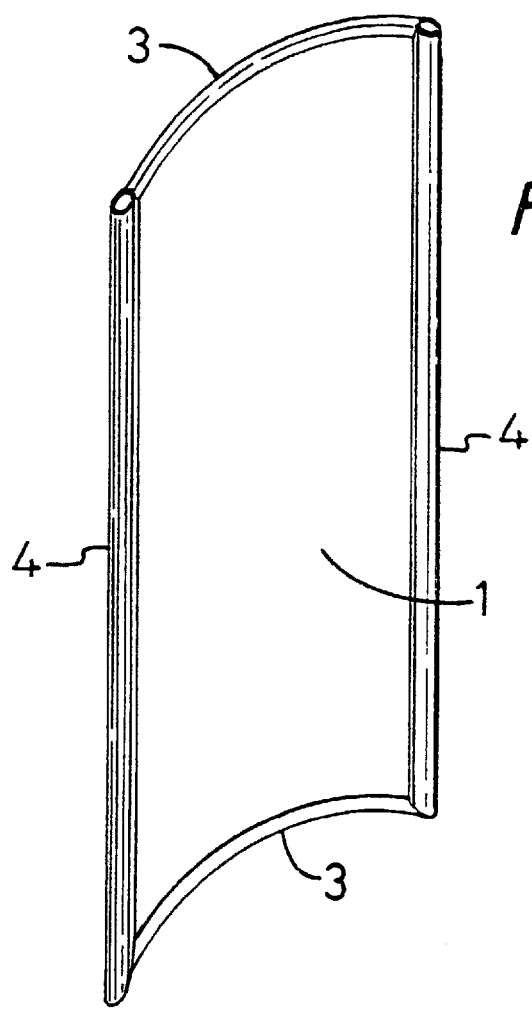
FIG. 23 is a perspective view of a fourth embodiment of the present invention.

A further embodiment of the invention is illustrated in FIG. 23. Unlike the previous embodiments the screen illustrated in this drawing is curved instead of being flat. Typically it could be semi-circular in plan view, The principle of construction is exactly the same as in the previous embodiments, the only difference being that the transverse frame members 3 are curved instead of straight.

FIG. 24

Instead of the arrangement of FIGS. 17 and 18, the arrangement of FIG. 24 would preferably be used to provide the sliding connection between the bottom and top of a screen and the bottom and top runners of FIGS. 14 and 15.

With the arrangement of FIG. 24, essentially the same component 24 is used to provide both the top and bottom guide member, unlike the arrangement of FIGS. 17 and 18 in which two different items 15 and 16 are employed.

A similar guide component 24 would be mounted on the other end of the screen frame in order to engage in a bottom runner 12, assuming that the runner 12 shown in FIG. 24 is the top runner.

I claim:

1. A decorative screen assembly, comprising a surrounding frame having at least two frame members;

a laminar member attached to the surrounding frame; and a cam arrangement for connecting the frame members, wherein the frame members are attached to the laminar member through pockets formed around the laminar member, and relative positions of the frame members may be adjusted to vary tension in the laminar member;

wherein the cam arrangement comprises a cam member attached to one end of a first frame member;

a screw member attached to one end of a second frame member, wherein rotation of the screw member causes movement of the frame members to vary tension in the laminar member applied by the frame members; and an end cap which fits in the end of the second frame member, wherein the screw member is threaded into the end cap.

2. The decorative screen assembly according to claim 1, wherein the laminar member has a graphic display for decorative purpose.

3. The decorative screen assembly according to claim 1, wherein the laminar member is adapted to be rolled up along two stick-shaped frame members that are connect ed to two opposite sides of the laminar member.

4. The decorative screen assembly according to claim 1, wherein there are a total of four frame members connected together by the cam arrangement.

5. The decorative screen assembly according to claim 1, wherein the frame members are connected together to form a geometric shape.

6. The decorative screen assembly according to claim 5, wherein the geometric shape is a rectangle.

7. The decorative screen assembly according to claim 1, wherein the relative positions of the frame members are adjusted so that the laminar member is flat and in a single plane.

8. The decorative screen assembly according to claim 1, wherein two of the frame members are curved so that the laminar member is held in a curved shape.

9. The decorative screen assembly according to claim 1, wherein the cam member has an inclined cam surface, wherein movement of the screw member against the cam surface will cause the first frame member to move in a first direction, and the second frame member to move in a second direction perpendicular to the first direction.

10. The decorative screen assembly according to claim 1, wherein the screw member comprises an allen key connecting to a captive screw.

11. A decorative screen assembly, comprising a surrounding frame having at least two frame members;

a laminar member attached to the surrounding frame; and a cam arrangement for connecting the frame members, wherein the frame members are attached to the laminar member through pockets formed around the laminar member, and relative positions of the frame members may be adjusted to vary tension in the laminar member;

wherein the cam arrangement comprises a cam member attached to one end of a first frame member;

a screw member attached to one end of a second frame member, wherein rotation of the screw member causes movement of the frame members to vary tension in the laminar member applied by the frame members; and the cam member has a spigot member fitting into the end of the first frame member.

12. A decorative screen assembly, comprising a surrounding frame having at least two frame members;

a laminar member attached to the surrounding frame; and a cam arrangement for connecting the frame members, wherein the frame members are attached to the laminar member through pockets formed around the laminar member, and relative positions of the frame members may be adjusted to vary tension in the laminar member;

wherein the cam arrangement comprises a cam member attached to one end of a first frame member; the cam member having an inclined cam surface, wherein movement of the screw member against the cam surface will cause the first frame member to move in a first direction, and the second frame member to move in a second direction perpendicular to the first direction;

a screw member attached to one end of a second frame member, wherein rotation of the screw member causes movement of the frame members to vary tension in the laminar member applied by the frame members;

the screw member comprises an Allen key and a captive screw; and the cam surface is provided with a slot, through which the Allen key is adapted to be inserted into the slot and to engage an end of the captive screw.

* * * * *